United States Patent
Shin

(10) Patent No.: US 8,024,999 B2
(45) Date of Patent: Sep. 27, 2011

(54) CUTTER APPARATUS OF MILLING MACHINE

(75) Inventor: Yong Ha Shin, Gyeonggi-do (KR)

(73) Assignee: Kia Motors Corporation, Seoul (KR)

( * ) Notice: Subject to any disclaimer, the term of this patent is extended or adjusted under 35 U.S.C. 154(b) by 219 days.

(21) Appl. No.: 12/371,069

(22) Filed: Feb. 13, 2009

(65) Prior Publication Data

US 2010/0143053 A1 Jun. 10, 2010

(30) Foreign Application Priority Data

Dec. 4, 2008 (KR) .................. 10-2008-0122645

(51) Int. Cl.
  *B23B 5/18* (2006.01)
  *B23B 3/00* (2006.01)
(52) U.S. Cl. ........................................... 82/106; 82/117
(58) Field of Classification Search .............. 82/117, 82/118, 157, 158, 120, 121
See application file for complete search history.

(56) References Cited

U.S. PATENT DOCUMENTS

| 3,213,756 | A | * | 10/1965 | Ash, II | 409/5 |
| 4,413,539 | A | * | 11/1983 | Ishizuka et al. | 82/120 |
| RE32,211 | E | * | 7/1986 | Jerue et al. | 82/1.2 |
| 4,679,973 | A | * | 7/1987 | Kodama et al. | 409/200 |
| 6,928,909 | B1 | * | 8/2005 | Akimoto et al. | 82/129 |
| 2007/0264096 | A1 | * | 11/2007 | Savoie | 409/131 |

* cited by examiner

*Primary Examiner* — Will Fridie, Jr.
(74) *Attorney, Agent, or Firm* — Edwards Angell Palmer & Dodge LLP; Kongsik Kim

(57) ABSTRACT

A cutter apparatus of a milling machine includes: a transmitting means in an X-axis direction provided with a spindle and a motor delivering rotation power to the spindle; a milling cutter rotatably arranged at one side of the transmitting means so as to cut a work piece; and a tool holder interposed between the spindle and the milling cutter and connecting the milling cutter to be able to eccentrically rotate in a Y-axis direction. Since the necessity of a transmitting means in a Y-axis direction can be eliminated, a mechanical structure can be simplified and a problem of restriction of addition of a model and modification of a work piece can be solved.

2 Claims, 3 Drawing Sheets

CUTTER APPARATUS OF MILLING MACHINE

CROSS-REFERENCE TO RELATED APPLICATION

This application claims priority to and the benefit of Korean Patent Application No. 10-2008-0122645 filed on Dec. 4, 2008, the entire contents of which are incorporated herein by reference.

BACKGROUND (a) Technical Field

The present invention relates to a cutter apparatus of a milling machine having a simplified mechanical structure.

(b) Description of the Related Art

A milling machine is a machine tool used to cut a fixed work piece in a desired shape by a cutter blade operatively linked with a spindle of an electric motion part.

A cutter apparatus of a conventional milling machine needs both a transmitting means in an X-axis (front and rear) direction and that in a Y-axis (up and down) direction for forming a work piece in various dimensions.

As an example, in forming slots of two different types of metal bearings of 149.6 mm with a distance of 152 mm between centers, if only a transmitting means in an X-axis direction is provided, deviation of 2.4 mm can be caused.

Accordingly, the apparatus becomes mechanically complicated and installation cost is also increased.

SUMMARY

The present invention has been made in an effort to provide a cutter apparatus of a milling machine which can eliminate a transmitting means in a Y-axis direction.

An exemplary embodiment of the present invention provides a cutter apparatus of a milling machine including: a transmitting means in an X-axis direction provided with a spindle and a motor delivering rotation power to the spindle; a milling cutter rotatably arranged at one side of the transmitting means so as to cut a work piece; and a tool holder interposed between the spindle and the milling cutter and connecting the milling cutter to be able to eccentrically rotate in a Y-axis direction.

The tool holder may include: a housing supported by an adapter fixed to the spindle; a spindle restriction part coupled to one side of the housing to be supported and coupled to the spindle to be operable in connection with the spindle; and a universal joint eccentrically connecting the spindle restriction part and the milling cutter together.

The spindle restriction part may be formed to be coupled to and separated from the spindle so that the eccentric distance of the milling cutter can be regulated.

Figure 1:
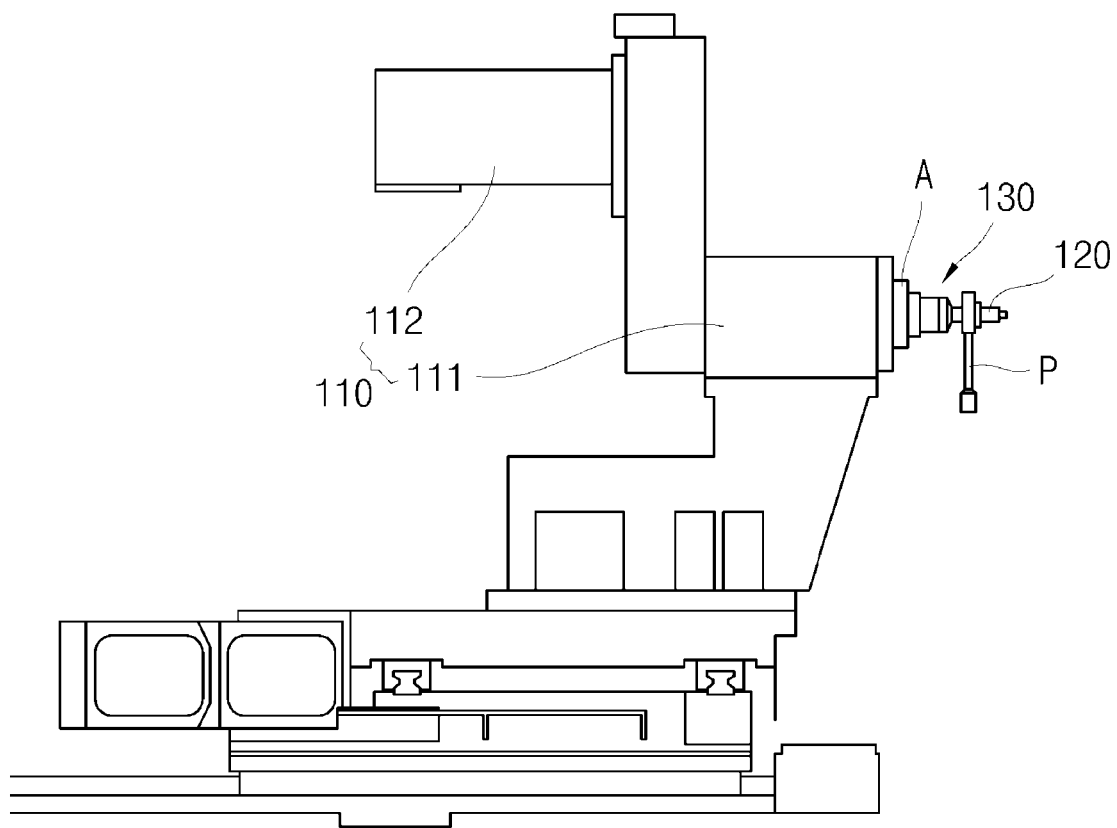
FIG. 1 is a cutter apparatus of a milling machine according to an embodiment of the present invention.

Reference numerals set forth in the Drawings includes reference to the following elements as further discussed below:

| 100: cutter apparatus of milling machine | 110: transmitting means |
| 120: milling cutter | 130: tool holder |
| 131: housing | 133: spindle restriction part |
| 135: universal joint | A: adapter |
| P: work piece | E: eccentric amount |

DETAILED DESCRIPTION

Exemplary embodiments of the present invention will hereinafter be described in detail with reference to the drawing.

Terms and words used in the specification and claims should not interpreted limitedly as general literal meanings, and should be interpreted as meanings and concepts which are complied with the spirit of the invention in conformity with the principle that the inventor can define the meaning of words in order to explain the invention in a best way.

Accordingly, an embodiment disclosed in the specification and the structure shown in the drawings are only an embodiment of the present invention, and does not cover all the spirit of the invention, so it should be understood that there are various equivalents and variations which substitute the same at the time of filing.

Figure 2:
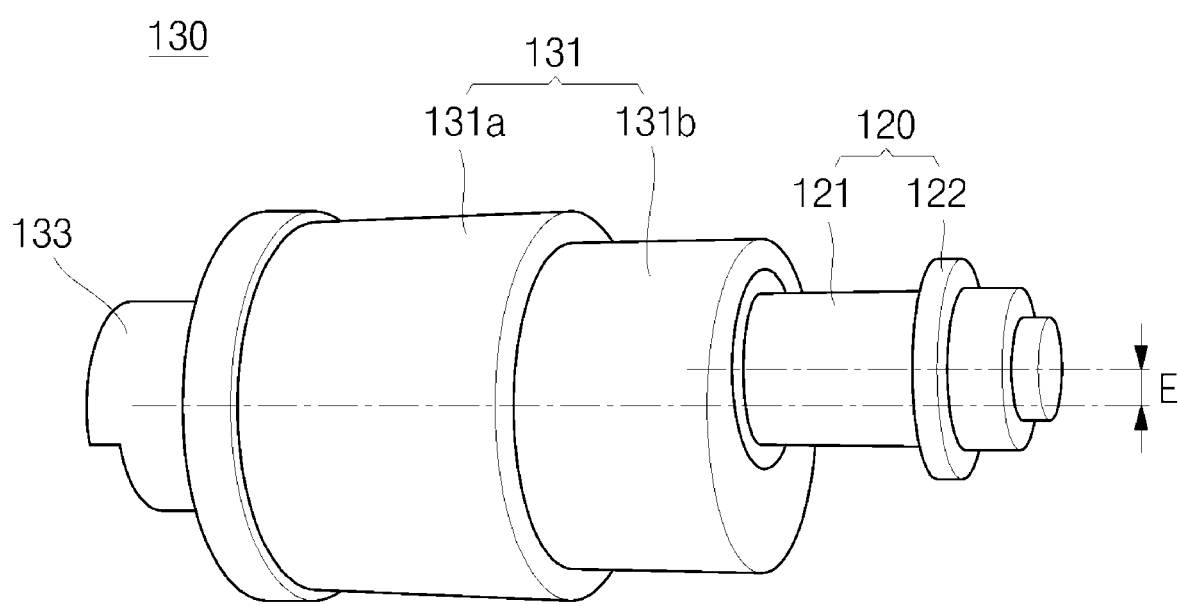
FIG. 2 is an enlarged perspective view showing the tool holder of the cutter apparatus of FIG. 1.
Figure 3:
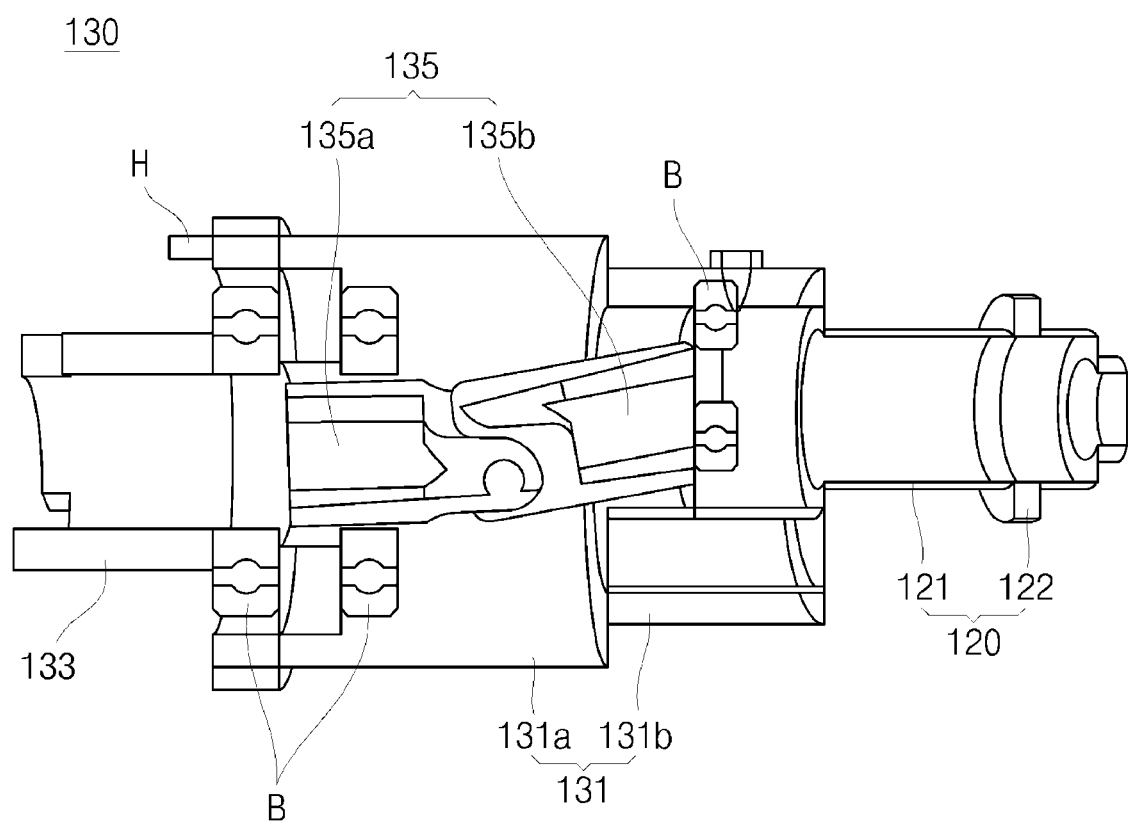
FIG. 3 is an enlarged sectional view showing the tool holder of the cutter apparatus of FIG. 1.

FIG. 1 is a cutter apparatus of a milling machine according to an embodiment of the present invention, FIG. 2 is an enlarged perspective view showing the tool holder of the cutter apparatus of FIG. 1, and FIG. 3 is an enlarged sectional view showing the tool holder of the cutter apparatus of FIG. 1.

As shown in the drawings, a cutter apparatus 100 of a milling machine according to an embodiment of the present invention includes a transmitting means 110 in an X-axis direction provided with a spindle 111 and a motor 112 delivering rotation power to the spindle, a milling cutter 120 rotatably arranged at one side of the transmitting means 110 so as to cut a work piece P, and a tool holder 130 interposed between the spindle 111 and the milling cutter 120 and connecting the milling cutter 120 to be able to eccentrically rotate in a Y-axis direction.

The milling cutter 120 includes a cylindrical rotatable cutter shaft 121 and a cutter blade 122 mounted at a circumferential surface of the cutter shaft 121 to rotate to cut the work piece P in response to the rotation of the cutter shaft 121.

Furthermore, the tool holder 130 includes a housing 131 supported by an adapter A fixed to the spindle 111, a spindle restriction part 133 coupled to one side of the housing 131 to be supported and coupled to the spindle 111 to be operable in connection with the spindle 111, and a universal joint 135 eccentrically connecting the spindle restriction part 133 and the milling cutter 120 together.

The housing 131 may include a bearing housing 131a and an eccentric housing 131b.

The bearing housing 131a is provided with at least one bearing B at an inner circumferential surface such that the spindle restriction part 133 is rotatably inserted thereinto at one side thereof, and is fixed to the adapter A by a holder pin H which is provided at an outer circumferential surface.

The eccentric housing 131b is fixed to the other side of the bearing housing 131a, and is provided with at least one bearing B at an inner circumferential surface so that the milling cutter 120 is eccentrically rotatably inserted thereinto.

The spindle restriction part 133 is formed such that an outer surface thereof is able to be coupled to and separated from the spindle 111 so as to receive the rotation power of the spindle 111 and that the eccentric distanc of the milling cutter 120 can be arbitrarily regulated by replacement of the tool holder 130, which removes the necessity of providing a transmitting means in a Y-axis direction.

The universal joint 135 may include a drive axle 135a and a driven axle 135b. An end of the drive axle 135a is inserted into the bearing housing 131a so as to be operatively linked with the spindle restriction part 133. An end of the driven axle 135b is connected to the other end of the drive axle 135a by a cross-shaped member and the other end thereof is disposed within the eccentric housing 131b so as to transmit rotation power to the cutter shaft 121.

Operation of the above-described cutter apparatus will be explained with reference to the drawings hereinafter.

The rotation power of the transmitting means 110 in an X-axis direction is transmitted through the spindle restriction part 133, and this rotation power is eccentrically transmitted to the cutter shaft 121 through the drive axle 135a and the driven axle 135b of the universal joint 135 supported to the housing 131. Accordingly, the cutter blade 122 rotates so that the work piece P is cut.

The eccentric distance of the milling machine can be arbitrarily regulated by separating the cutter apparatus 100 of the milling machine and replacing the same with other cutter apparatus.

Accordingly, a transmitting means in a Y-axis direction is not required, which simplifies the structure of cutting apparatus, reduces manufacturing costs and solve a problem of restriction of addition and replacement of a work piece model, i.e., reconstruction of a transmitting means in a Y-axis direction.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cutter apparatus of a milling machine, comprising:
    a transmitting means in an X-axis direction provided with a spindle and a motor delivering rotation power to the spindle;
    a milling cutter rotatably arranged at one side of the transmitting means so as to cut a work piece; and
    a tool holder interposed between the spindle and the milling cutter and connecting the milling cutter to be able to eccentrically rotate in a Y-axis direction,
    wherein the tool holder comprises:
    a housing supported by an adapter fixed to the spindle;
    a spindle restriction part coupled to one side of the housing to be supported and coupled to the spindle to be operable in connection with the spindle; and
    a universal joint eccentrically connecting the spindle restriction part and the milling cutter together.

2. The cutter apparatus of claim 1, wherein the spindle restriction part is formed to be able to be coupled to and separated from the spindle so that the eccentric distance of the milling cutter can be regulated.

* * * * *